US007740935B2

(12) United States Patent
Srisothornwongse

(10) Patent No.: US 7,740,935 B2
(45) Date of Patent: Jun. 22, 2010

(54) EMBLEM FOR SECURING TO AN ARTICLE

(75) Inventor: Anil K. Srisothornwongse, Bangkok (TH)

(73) Assignee: Penn Emblem Corporation, Philadelphia, PA (US)

( * ) Notice: Subject to any disclaimer, the term of this patent is extended or adjusted under 35 U.S.C. 154(b) by 247 days.

(21) Appl. No.: 11/758,943

(22) Filed: Jun. 6, 2007

(65) Prior Publication Data

US 2008/0305703 A1 Dec. 11, 2008

(51) Int. Cl.
*B32B 7/12* (2006.01)
*B32B 27/04* (2006.01)
*B32B 27/12* (2006.01)
*D05C 17/00* (2006.01)
*D05B 3/00* (2006.01)

(52) U.S. Cl. .................. 428/343; 112/475.18; 112/439; 442/150; 442/152; 442/149

(58) Field of Classification Search .................. 428/343; 442/149, 150, 286, 152
See application file for complete search history.

(56) References Cited

U.S. PATENT DOCUMENTS

| 3,657,060 | A | * | 4/1972 | Haigh | 428/175 |
| 3,816,211 | A | | 6/1974 | Haigh | |
| 4,517,910 | A | | 5/1985 | Jalowsky | |
| 4,981,742 | A | * | 1/1991 | Haigh | 428/66.5 |
| 5,009,943 | A | * | 4/1991 | Stahl | 428/40.6 |
| 6,194,044 | B1 | | 2/2001 | Stahl | |
| 6,263,817 | B1 | | 7/2001 | Tajima et al. | |
| 7,467,593 | B2 | * | 12/2008 | Jurnovoy | 112/475.18 |
| 2004/0147347 | A1 | | 7/2004 | Gerak et al. | |
| 2005/0066866 | A1 | | 3/2005 | Pederzini | |

FOREIGN PATENT DOCUMENTS

JP 2001303431 10/2001

OTHER PUBLICATIONS woven definition, May 17, 2007.*

* cited by examiner

*Primary Examiner*—Callie E Shosho
*Assistant Examiner*—Samir Shah
(74) *Attorney, Agent, or Firm*—Panitch Schwarze Belisario & Nadel LLP

(57) ABSTRACT

An emblem having a design for securing to an article by the application of at least one of heat and pressure comprises a base having a front surface and a rear surface, the base being comprised of a woven fabric. The emblem design is comprised of two portions, a first portion of the emblem design being woven into the fabric base when the fabric base is made and a second portion of the emblem design being embroidered into the fabric base. A layer of thermoplastic adhesive material is bonded to the rear surface of the fabric base for securing the emblem to the article.

6 Claims, 2 Drawing Sheets

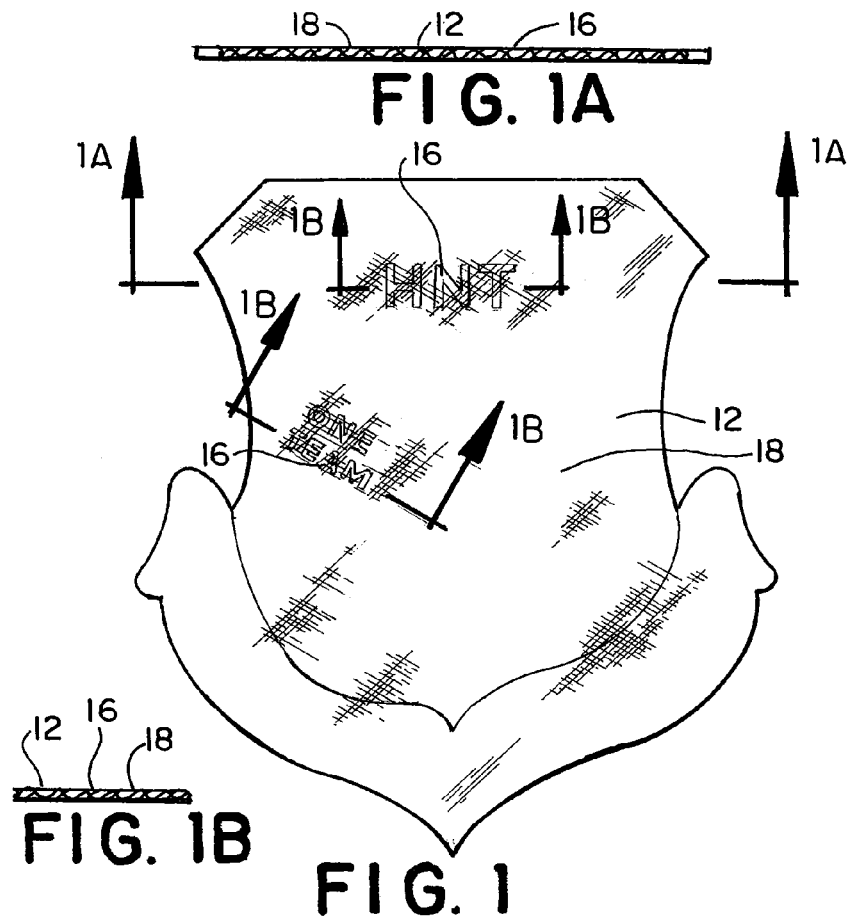
FIG. 1A
FIG. 1B
FIG. 1
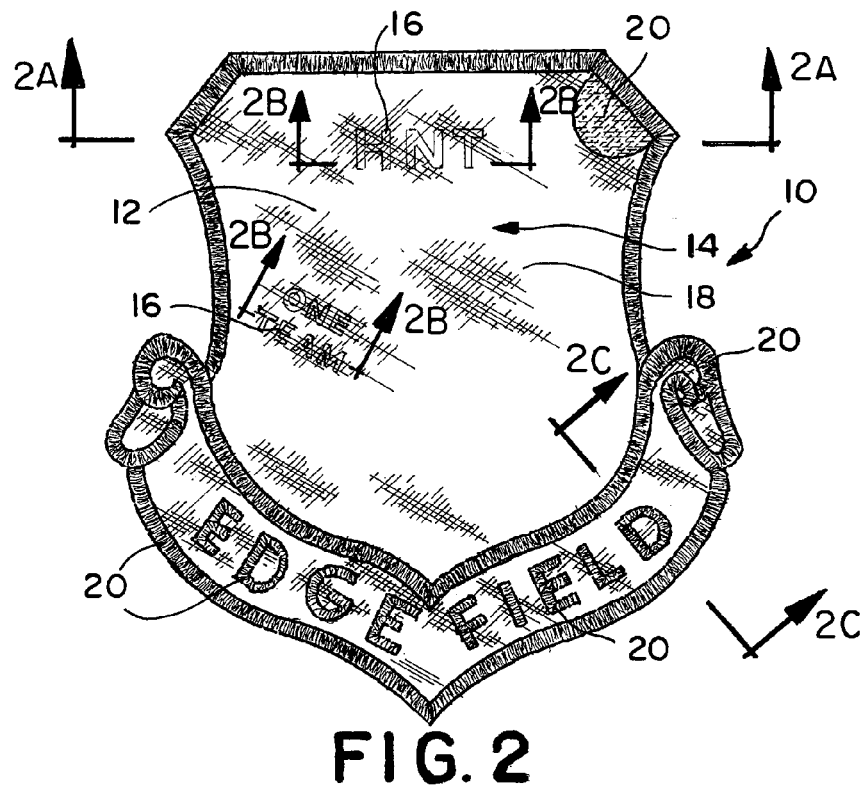
FIG. 2

EMBLEM FOR SECURING TO AN ARTICLE

BACKGROUND OF THE INVENTION

The present invention relates to an emblem and a method of making an emblem and, in particular, an emblem and a method of making an emblem in which the emblem design is comprised of a first portion which is woven into the fabric base and a second portion which is embroidered into the fabric base.

In general, embroidered emblems and methods for making embroidered emblems are well known in the art. A particular embroidered emblem and method of making the embroidered emblem is disclosed in U.S. Pat. Nos. 3,657,060 entitled "Embroidered Emblem With Thermoplastic Adhesive" and 3,816,211 entitled "Method For Making Embroidered Emblem" both of which are owned by the assignee of the present application. These two related patents disclose an embroidered emblem of the type shown in FIG. 3 of the present application and which comprises a fabric base 112 with an emblem design 114 which is completely embroidered into the fabric base such that substantially the entire front or first principle surface 116 of the fabric base is covered by the embroidery. The emblem further includes a thermoplastic adhesive material 118 laminated or bonded to the rear or second principal surface 120 of the fabric base 112. In this manner, the embroidered emblem 110 can be conveniently fastened to a garment or other fabric surface through the application of at least one of heat and pressure to melt the thermoplastic material 118 and thereby bond the fabric base 112 to the garment or other fabric surface. A similar emblem and method is disclosed in U.S. Pat. No. 4,981,742. The subject matter of each of the three above-mentioned patents is hereby incorporated by reference into the present application.

While the embroidered emblems disclosed in the three above-mentioned patents are quite acceptable and while the methods disclosed in the patents are quite useful in manufacturing such emblems, there is a need in the art for a more sophisticated emblem which provides for sharper, finer details which are not achievable with a fully embroidered emblem. The present invention meets these requirements by providing an emblem in which a first portion of the emblem design is initially woven into the fabric of the emblem base when the fabric base is made to provide a crisp, clear appearance and a second portion of the emblem design which is thereafter embroidered into the fabric base to provide depth to the finished emblem. The resulting combination woven and embroidered design provides an enhanced appearance which is sharper or finer in detail than the appearance of an emblem in which the design has been completely embroidered.

BRIEF SUMMARY OF THE INVENTION

Briefly stated, the present invention, in one embodiment, comprises an emblem having a design for securing to an article by the application of at least one of heat and pressure. The emblem has a base having a front surface and a rear surface, the base being comprised of a woven fabric. An emblem design is comprised of two portions, a first portion of the emblem design being woven into the fabric base when the fabric base is made and a second portion of the emblem design being embroidered into the fabric base. A layer of thermoplastic adhesive material is bonded to the rear surface of the fabric base for securing the emblem to the article.

Briefly stated, the present invention, in one embodiment, comprises an emblem having a design for securing to an article by the application of at least one of heat and pressure. The emblem has a base having a front surface and a rear surface, the base being comprised of a woven fabric. An emblem design is comprised of two portions, a first portion of the emblem design being woven into the fabric base when the fabric base is made and a second portion of the emblem design being embroidered into the fabric base. A layer of thermoplastic adhesive material is bonded to the rear surface of the fabric base for securing the emblem to the article.

In another embodiment, the present invention comprises a method of making an emblem having a design for securing to an article by the application of at least one of heat and pressure. The method includes the steps of: providing a base having a front surface and a rear surface, the base being of a woven fabric, a first portion of the emblem design being woven into the fabric base when the fabric base is made; embroidering a second portion of the emblem design into the fabric base; and bonding a layer of thermoplastic adhesive material to the rear surface of the fabric base for securing the emblem to the article.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a top plan view of a fabric base including a first portion of an emblem design woven therein in accordance with a preferred embodiment of the present invention;

FIG. 1A is a cross sectional view of the fabric base taken along line 1A-1A of FIG. 1;

FIG. 1B is a cross sectional view of the fabric base taken in two places along lines 1B-1B of FIG. 1;

FIG. 2 is a top plan view of a finished emblem made from the fabric base of FIG. 1 and further including a second portion of the emblem design embroidered into the fabric base;

DETAILED DESCRIPTION OF THE INVENTION

Figure 3:
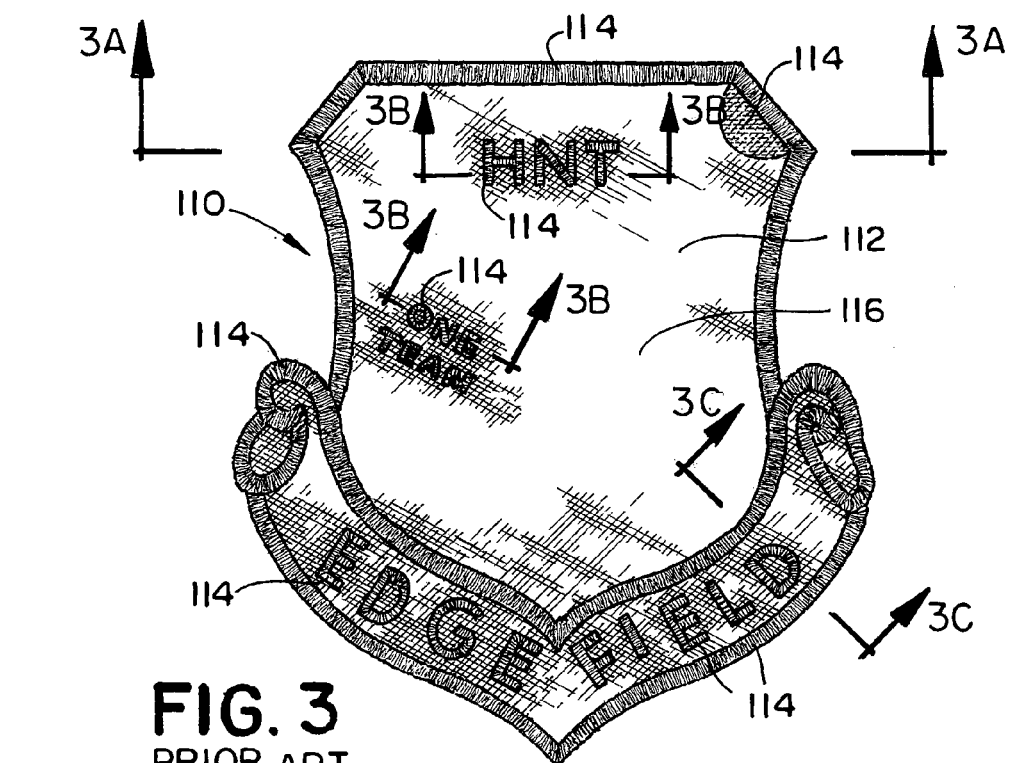
FIG. 3 is a top plan view of a fully embroidered emblem in accordance with the prior art.
Figure 3A:
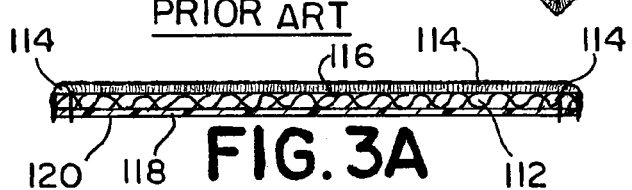
FIG. 3A is a cross sectional view of the prior art emblem taken along line 3A-3A of FIG. 3.
Figure 3B:
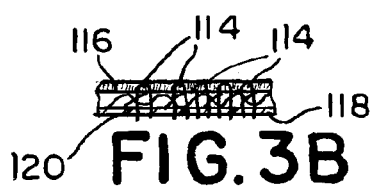
FIG. 3B is a cross sectional view of the prior art emblem taken in two places along lines 3B-3B of FIG. 3.
Figure 3C:
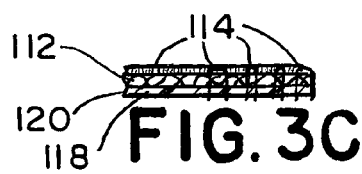
FIG. 3C is a cross sectional view of the prior art emblem taken along line 3C-3C of FIG. 3.

Referring now to the drawings in detail, there is shown in FIG. 3 a fully embroidered emblem 110 in accordance with the prior art for being secured to an article, preferably a fabric (not shown) such as a garment, hat or other article of clothing or some other article such as a banner, flag or any other such article, using at least one of heat and pressure. The fully embroidered emblem 110 is comprised of a base 112 which is preferably made of a woven textile fabric such as 100% polyester, 100% cotton or a polyester/cotton blend of about 65% polyester and about 35% cotton. The fabric base 112 of the prior art fully embroidered emblem 110 is typically a single color, usually white, and has a predetermined thickness which is suitable for supporting the threads of the embroidered design 114. As shown in FIGS. 3A, 3B and 3C, the embroidered design 114 is completely embroidered into the fabric base 112, typically using an embroidery machine, in a manner well known in the art such that substantially the entire front or first principle surface 116 of the fabric base 112 is completely covered by the threads of the embroidery and little or none of the front surface 116 of the fabric base 112 is visible thereafter. The fully embroidered prior art emblem 110 further includes a layer of a thermoplastic adhesive material 118 laminated or bonded to the rear or second principal surface 120 of the fabric base 112. The thermoplastic adhesive material 118 is the same as or substantially the same as the thermoplastic adhesive material described in detail in the above-identified U.S. patents and is bonded or secured to the rear surface 120 of the fabric base 112 in the same or substantially the same manner described in the above-identified U.S. patents. In this manner, the fully embroidered emblem 110 can be conveniently fastened to a garment or other fabric or article through the application of at least one of heat and pressure, and preferably both, to melt the thermoplastic material 118 and thereby bond or secure the fabric base 112 to the garment or other fabric or article substantially as described in the above-identified U.S. patents.

The present invention comprises an improvement over the prior art fully embroidered emblem 110 which provides an enhanced appearance which is sharper or finer in detail. An emblem in accordance with the present invention includes an emblem design which is formed of two separate portions, a first portion which is initially woven into the fabric base when the fabric base is made and a second portion which is later embroidered into the fabric base. The two portions of the emblem design compliment each other to provide the overall enhanced emblem design.

FIG. 1 shows the first step in making an emblem 10 in accordance with a preferred embodiment of the present invention. The emblem 10 includes a fabric base 12 which, like the prior art emblem, is preferably made of a woven textile fabric such as 100% polyester, 100% cotton or a polyester/cotton blend of about 65% polyester and about 35% cotton. In the present embodiment the fabric base 12 is generally plaque shaped in plan view. It will be appreciated by those of ordinary skill in the art that the shape of the fabric base 12 as well as the size of the fabric base 12 may vary in particular applications. More specifically, the fabric base 12 may be rectangular, circular, square, triangular or virtually or any other desired shape. The fabric base 12 has a predetermined thickness which is the same as or substantially the same as the thickness of the fabric base 112 of the prior art emblem 110 and is suitable for supporting the threads of the embroidered second portion 20 of the emblem design 14 as described below with respect to FIG. 2.

As shown in FIG. 1, a first portion 16 of the emblem design 14 is woven directly into the fabric base 12 preferably at the time that the fabric base 12 is made. In the illustrated embodiment, the first portion 16 of the emblem design 14 includes the background color or colors of the emblem 10, the outline of the banner at the lower end of the fabric base 12, the letters "HNT" and the words "ONE TEAM". Other features of the emblem design 14 may also be woven into the fabric base 12 if desired. As shown by FIGS. 1A and 1B, because the features forming the first portion 16 of the emblem design 14 are woven directly into the fabric base 12, the first portion 16 of the emblem design 14 does not extend outwardly from the front or first principle surface 18 of the fabric base 12 which is essentially flat. This is different from the fully embroidered emblem 110 of the prior art (FIG. 3) in which the embroidered design 114 extends outwardly beyond the front surface of the fabric base 112 over substantially the entire fabric base 112. Additionally, with the first portion 16 of the emblem design 14 being woven into the fabric base 12, the first portion 16 is more crisp and clear than the corresponding portion of the fully embroidered design 114 of the prior art emblem 110.

Figure 2A:
FIG. 2A is a cross sectional view of the finished emblem taken along line 2A-2A of FIG. 2.
Figure 2B:
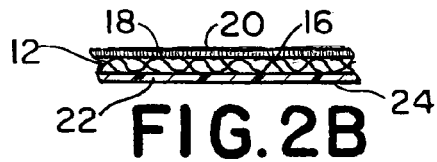
FIG. 2B is a cross sectional view of the finished emblem taken in two places along lines 2B-2B of FIG. 2.
Figure 2C:
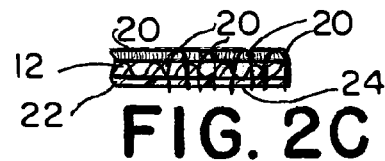
FIG. 2C is a cross sectional view of the finished emblem taken along line 2C-2C of FIG. 2.

FIG. 2 shows the completed emblem 10 in accordance with the preferred embodiment of the present invention. The emblem 10 is completed by embroidering the second portion 20 of the emblem design 14 into the fabric base 12 of FIG. 1. The second portion 20 is embroidered into the fabric base 12 in a manner well known in the art for making the prior art emblem 110 and as described in the above-identified U.S. Patents. In the illustrated embodiment, the second portion 20 of the emblem design 14 includes: the border extending around the banner at the bottom of the emblem 10, the border extending around the peripheral edge of the remainder of the fabric base 12, the words "EDGE FIELD" which appear in the banner, and the semicircular area near the top right edge of the emblem 10. As shown in FIGS. 2A, 2B and 2C, because the second portion 20 of the emblem design 14 is embroidered into the fabric base 12, the threads of the embroidery that form the second portion 20 of the emblem design 14 extend outwardly beyond the plane of the front surface 18 of the fabric base 12 in a manner which is the same as the prior art fully embroidered emblem 110. The second portion 20 of the emblem design 14 adds depth to the overall emblem design 14 and compliments the first portion 16 to provide an enhanced appearance over the fully embroidered emblem 110 having essentially the same emblem design 114.

In the preferred embodiment, the first portion 16 makes up approximately ninety percent of the emblem design 14 with the embroidered second portion 20 making up the remainder of the emblem design 14. It will be appreciated that the ratio of the first portion 16 to the second portion 20 of the emblem design 14 will vary for different emblems and the present invention is not limited to a particular ratio. Preferably the first portion 16 makes up a substantial portion and, more preferably, at least thirty percent of the emblem design 14. Preferably, the first portion 16 comprises at least the background color or colors of the emblem design 14.

The embroidered emblem 10 further includes a layer of a thermoplastic adhesive material 22 laminated or bonded to the rear or second principal surface 24 of the fabric base 12. The thermoplastic adhesive material 22 is the same as or substantially the same as the thermoplastic adhesive material described in detail in the above-identified U.S. patents and is bonded or secured to the rear surface 24 of the fabric base 12 in the same or substantially the same manner described in the above-identified U.S. patents. In this manner, the emblem 10 can be conveniently fastened to a garment or other fabric or article through the application of at least one of heat and pressure, and preferably both, to melt the thermoplastic material 22 and thereby bond or secure the fabric base 12 to the garment or other fabric or article substantially as described in the above-identified U.S. patents.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An emblem having an emblem design for securing to an article by the application of at least one of heat and pressure, the emblem comprising:

a fabric base having a planar front surface and a rear surface, the fabric base being comprised of a woven fabric with a first portion of the emblem design being woven into the fabric of the fabric base when the fabric base is made, the first portion of the emblem design including a background color or colors and one or more emblem design features so that the first portion of the emblem design does not extend outwardly beyond the planar front surface of the fabric base;

a second portion of the emblem design being embroidered into the fabric base after the fabric base with the first portion of the emblem design has been made, the embroidered second portion of the emblem design extending outwardly beyond the planar front surface of the fabric base; and a layer of thermoplastic adhesive material bonded to the rear surface of the fabric base for securing the emblem to the article.

2. The emblem as recited in claim 1 wherein the fabric base is comprised of a woven fabric selected from the group consisting of polyester, cotton and combinations thereof.

3. The emblem as recited in claim 1 wherein the thermoplastic adhesive material is polyurethane.

4. The emblem as recited in claim 1 wherein the second portion of the emblem design includes an embroidered border which extends around the outer periphery of the base.

5. The emblem as recited in claim 1 wherein the first portion of the emblem design comprises at least one third of the emblem design.

6. A method of making an emblem having an emblem design for securing to an article by the application of at least one of heat and pressure, the method comprising:

providing a fabric base having a planar front surface and a rear surface, the fabric base being of a woven fabric, a first portion of the emblem design being woven into the fabric of the fabric base when the fabric base is made and including a background color or colors and one or more emblem design features, the first portion of the emblem design not extending outwardly beyond the planar front surface of the fabric base;

embroidering a second portion of the emblem design into the fabric base after the fabric base with the first portion of the emblem design has been made, the embroidered second portion of the emblem design extending outwardly beyond the planar front surface of the fabric base; and bonding a layer of thermoplastic adhesive material to the rear surface of the fabric base for securing the emblem to the article.

* * * * *